(12) United States Patent
Yoshida et al.

(10) Patent No.: US 11,696,007 B2
(45) Date of Patent: Jul. 4, 2023

(54) IMAGING APPARATUS

(71) Applicant: CANON KABUSHIKI KAISHA, Tokyo (JP)

(72) Inventors: Takashi Yoshida, Tokyo (JP); Kenji Ishii, Kanagawa (JP); Koji Tamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/672,328

(22) Filed: Feb. 15, 2022

(65) Prior Publication Data

US 2022/0294955 A1 Sep. 15, 2022

(30) Foreign Application Priority Data

Mar. 12, 2021 (JP) .................. 2021-040120

(51) Int. Cl.
*H04N 23/52* (2023.01)
*H04N 23/63* (2023.01)
*G03B 17/14* (2021.01)
*G03B 17/56* (2021.01)

(52) U.S. Cl.
CPC .............. *H04N 23/52* (2023.01); *G03B 17/14* (2013.01); *G03B 17/561* (2013.01); *H04N 23/63* (2023.01)

(58) Field of Classification Search
CPC ........... H04N 5/22521; H04N 5/23293; H04N 5/2252; H04N 23/52; H04N 23/63; H04N 23/51; G03B 17/14; G03B 17/561
See application file for complete search history.

(56) References Cited

U.S. PATENT DOCUMENTS

| | | | |
|---|---|---|---|
| 9,578,214 B2 * | 2/2017 | Kawamura | H04N 5/2252 |
| 10,194,071 B2 * | 1/2019 | Lever | H04N 5/23203 |
| 10,939,577 B2 * | 3/2021 | Naito | H04N 9/3144 |
| 10,951,794 B2 * | 3/2021 | Colin | H05K 7/20154 |
| 11,190,671 B2 * | 11/2021 | Wada | H05K 7/20154 |
| 11,415,774 B2 * | 8/2022 | Yamamoto | H04N 5/22521 |
| 11,438,489 B1 * | 9/2022 | Saiki | H04N 5/22521 |
| 2006/0256199 A1 * | 11/2006 | Takahashi | G02B 7/028 |
| | | | 348/E5.026 |
| 2009/0002549 A1 * | 1/2009 | Kobayashi | H04N 5/22521 |
| | | | 348/374 |

(Continued)

FOREIGN PATENT DOCUMENTS

| | | |
|---|---|---|
| JP | 2015204422 A | 11/2015 |
| JP | 2017228876 A | 12/2017 |

*Primary Examiner* — Timothy J Henn
(74) *Attorney, Agent, or Firm* — Canon U.S.A., Inc. I.P. Division

(57) ABSTRACT

An imaging apparatus, having an imaging element has top, bottom, front, and rear sides, includes exterior members, a control circuit on a control circuit board to control the imaging apparatus, a display panel on the rear side as one of the exterior members, and a heat release fan. The control circuit board and the display panel are arranged sequentially in a direction of an optical axis from the front side to the rear side. A duct having a vent formed on the duct rear side as one of the exterior members extends from the rear side to the front side and from the top side to the bottom side and connects to a bottom side vent formed on the bottom side as one of the exterior members. The heat release fan is inside the duct near the bottom side below the control circuit board as one of the exterior members.

11 Claims, 8 Drawing Sheets

(56) References Cited

U.S. PATENT DOCUMENTS

2009/0244363 A1* 10/2009 Sugimura ........ H04N 5/225251
   348/E5.025
2016/0301819 A1* 10/2016 Petty .................. H04N 5/22521
2019/0385927 A1* 12/2019 Shibata ............ H04N 5/225251

* cited by examiner

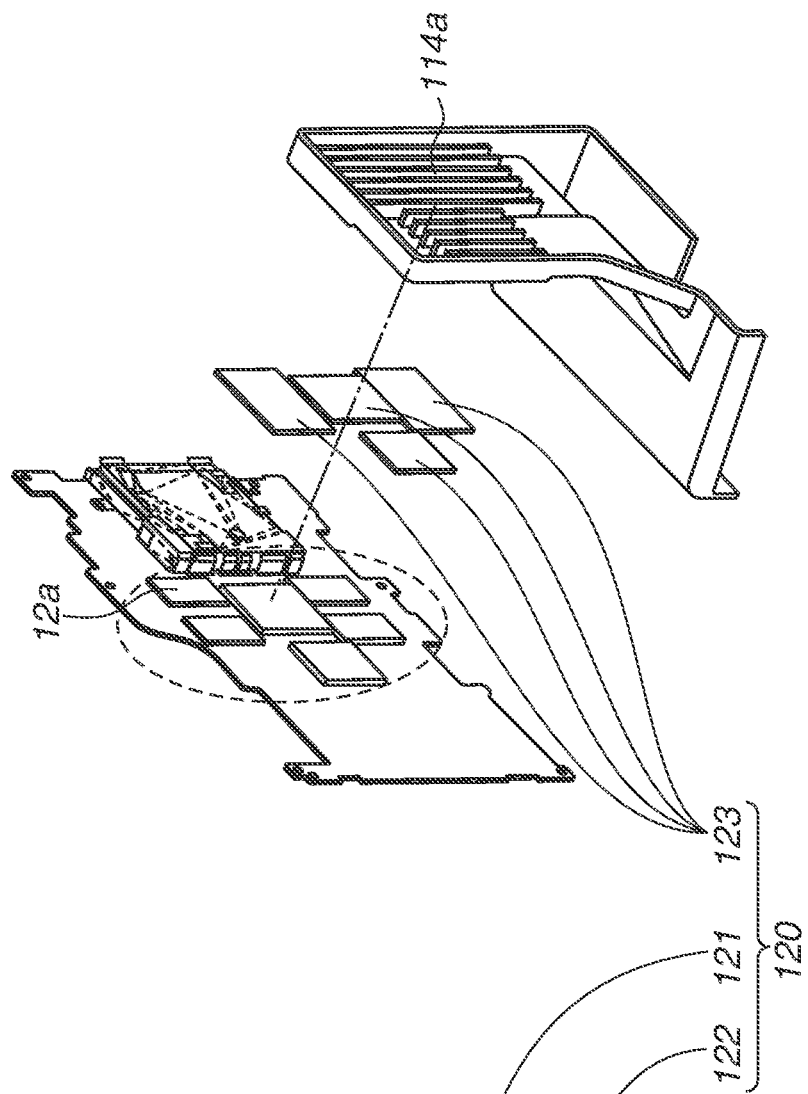
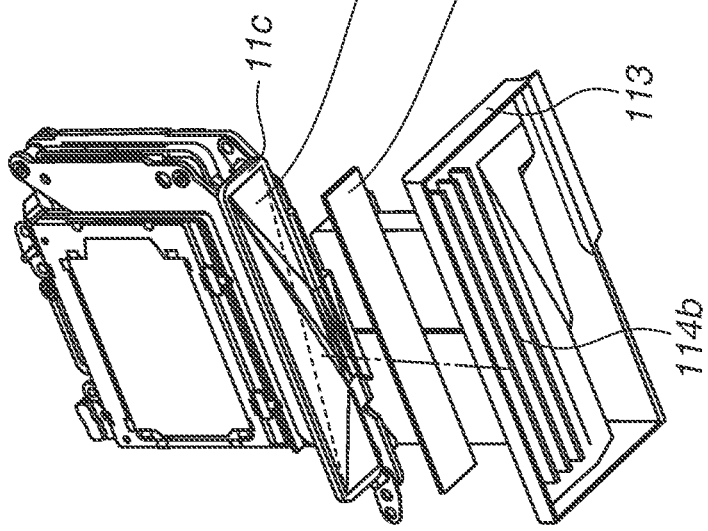

IMAGING APPARATUS

BACKGROUND

Field

The present disclosure relates to an imaging apparatus having a structure that releases the heat generated by heat sources.

Description of the Related Art

In response to a demand for miniaturization of electronic devices, recent years have seen significant progress in miniaturization and densification of components mounted inside devices.

Meanwhile, there is a growing demand for increased functionality of imaging apparatuses, in particular, for more sophisticated video functions. Consequently, devices are generating more heat.

When an imaging apparatus captures a video in a high temperature environment, the temperature inside the imaging apparatus rises. Thus, there is a high possibility that this temperature rise will cause a malfunction or a performance decrease of a mounted component, consequently resulting in a fault of the imaging apparatus.

In addition, in response to a demand for improvement of the image quality, recent years have seen the spread of an imaging apparatus that corrects blurring by moving an imaging element in a direction perpendicular to its optical axis direction.

When this kind of imaging apparatus that corrects blurring drives its blurring correction mechanism or performs continuous image capturing or video capturing, the heat generated by the imaging element also affects the image quality. Thus, sufficient heat release is needed.

When the amount of heat generated by an imaging apparatus is not sufficiently released naturally, a heat release structure based on forced air cooling using a fan is used.

Japanese Patent Application Laid-Open No. 2017-228876 discusses an apparatus that exhausts the air in the gap between an imaging element heatsink and a circuit board heatsink opposite thereto to the outside by using a fan disposed at the bottom side of the camera.

In addition, Japanese Patent Application Laid-Open No. 2015-204422 discusses an apparatus including a component serving both as an L-shaped heatsink and duct between an imaging element and a main board, the component having an air blowing fan.

However, since the apparatus discussed in the above Japanese Patent Application Laid-Open No. 2017-228876 directly suctions the outside air, dust and foreign particles easily enter the apparatus from the outside.

In addition, in the case of the apparatus discussed in Japanese Patent Application Laid-Open No. 2015-204422, since the fan is disposed in a part of the component serving both as a heatsink and duct, the apparatus has a large size.

SUMMARY

An exemplary embodiment of the present disclosure is directed to providing an imaging apparatus that satisfies a heat release performance without increasing the apparatus size.

According to an aspect of the present disclosure, an imaging apparatus having an imaging element, a top side, a bottom side, a front side, and a rear side having an upper side includes exterior members, a control circuit mounted on a control circuit board and configured to control the imaging apparatus, a display panel disposed on the rear side as one of the exterior members, and a heat release fan disposed on the bottom side as one of the exterior members, wherein the control circuit board and the display panel are arranged sequentially in a direction of an optical axis from the front side to the rear side, wherein it includes a duct, that includes a duct rear side and a vent formed on an upper side of the duct rear side as one of the exterior members, extends in the optical axis direction from the rear side to the front side, extends in a direction from the top side to the bottom side in an area between the control circuit board and the display panel, and connects to a bottom side vent formed on the bottom side of the imaging apparatus as one of the exterior members, and wherein the heat release fan is disposed inside the duct near the bottom side below the control circuit board.

Further features of the present disclosure will become apparent from the following description of exemplary embodiments with reference to the attached drawings.

BRIEF DESCRIPTION OF THE DRAWINGS

FIGS. 5A and 5B illustrate a structure of the duct and heat sources according to the first exemplary embodiment of the present disclosure.

DESCRIPTION OF THE EMBODIMENTS

Figure 1A:
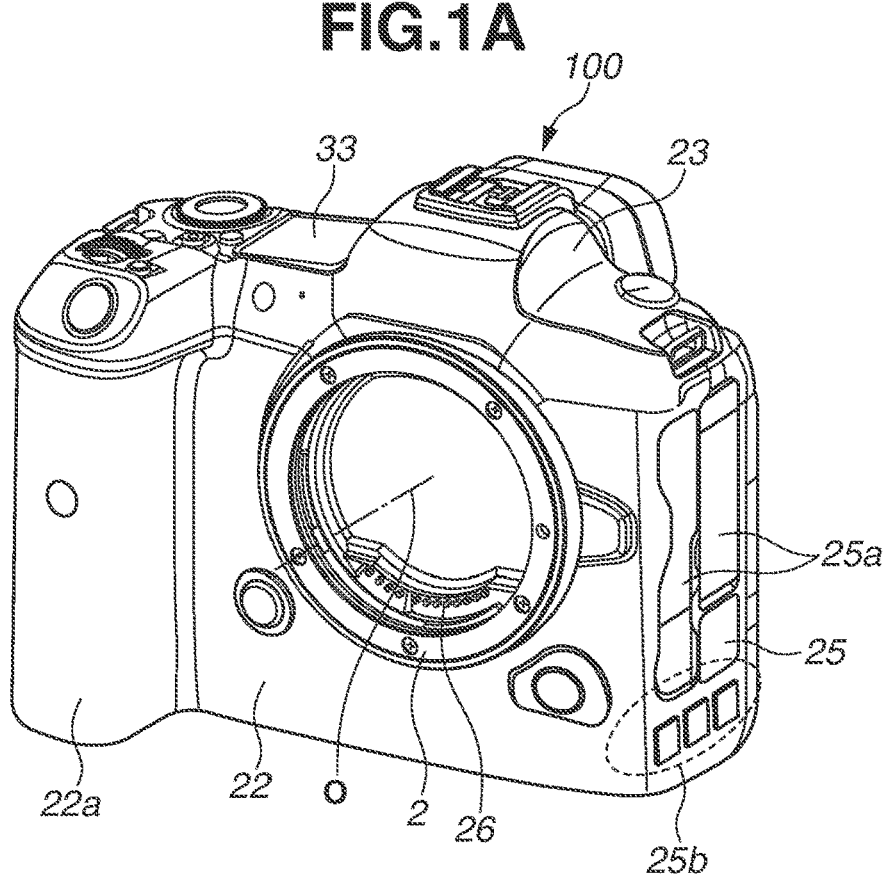
FIGS. 1A and 1B are perspective views of a digital camera according a first exemplary embodiment of the present disclosure.

Hereinafter, an exemplary embodiment of the present technique will be described in detail with reference to drawings.

Note that, for example, the sizes, materials, shapes, and relative arrangement of the components to be described below may suitably be modified, depending on the configuration of the apparatus to which the present disclosure is applied or depending on various kinds of conditions.

That is, the scope of the present disclosure is not limited to the following description.

Widely or publicly known techniques in the relevant technical fields may be applied to the configurations, structures, or steps not particularly illustrated or described. In addition, redundant description will be avoided as needed.

In the drawings, like reference characters will be used to denote like elements or elements having similar functions.

(Block Diagram Illustrating Configuration Example of Digital Camera 400 According to Exemplary Embodiment of Present Invention)

Figure 8:
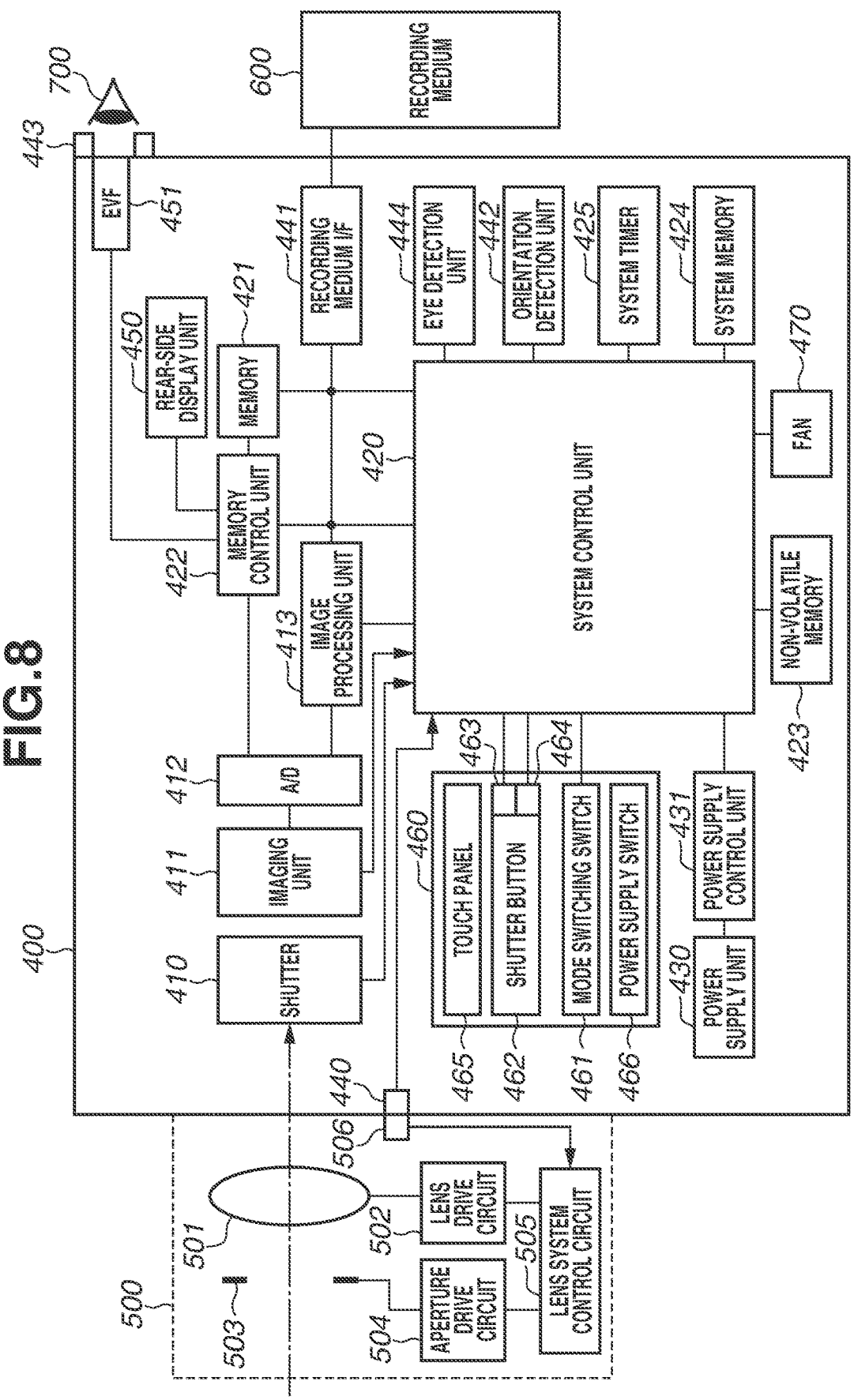
FIG. 8 is a block diagram according to an exemplary embodiment of the present disclosure.

FIG. 8 is a block diagram illustrating a configuration example of a digital camera 400 according to an exemplary embodiment of the present disclosure.

A shutter 410 is a focal plane shutter that can freely control the exposure time of an imaging unit 411 to be described below. The shutter 410 is controlled by a system control unit 420 to be described below.

The imaging unit 411 is an imaging device having an imaging surface, on which an object image (an optical image) that has passed through a lens 501 is formed. The imaging unit 411 performs photoelectric conversion and outputs an electrical signal (an analog signal) based on the optical image on the imaging surface.

As the imaging unit 411, a charge-coupled device (CCD) sensor or a complementary metal-oxide semiconductor (CMOS) sensor is used.

An analog/digital (A/D) converter 412 is a signal conversion unit used for converting the analog signal outputted by the imaging unit 411 into a digital signal.

An image processing unit 413 is an image computation unit that generates image data by performing predetermined pixel interpolation, resizing processing such as reduction, or color conversion processing on the digital signal outputted by the A/D converter 412 or a digital signal outputted by a memory control unit 422 to be described below.

Based on the computation result obtained by the image processing unit 413, the system control unit 420 performs aperture position control processing and lens position control processing.

The image processing unit 413 also performs computation processing by using the image data and performs through-the-lens (TTL) auto white balance (AWB) processing based on the obtained computation result.

The system control unit 420 includes at least one processor or circuit and controls the entire digital camera 400.

The system control unit 420 executes a program recorded in a non-volatile memory 423 to be described below, to realize processes according to the present exemplary embodiment of the present disclosure.

A memory 421 is a storage unit for temporarily storing the digital signal obtained by causing the A/D converter 412 to convert the analog signal outputted by the imaging unit 411 or the image data generated by the image processing unit 413.

The memory 421 has a sufficient storage capacity for storing a predetermined number of still images or a predetermined time of video or audio data.

The memory control unit 422 is a memory control unit for controlling exchange of the data controlled by the system control unit 420 with the A/D converter 412, the image processing unit 413, and the memory 421.

The digital signal outputted by the A/D converter 412 is directly written in the memory 421 via the image processing unit 413 and the memory control unit 422 or via the memory control unit 422 alone.

The non-volatile memory 423 is an electrically erasable and recordable read-only storage unit and stores constants, programs, etc. for operations of the system control unit 420.

A system memory 424 is a readable and writable storage unit for storing, for example, constants and variables for operations of the system control unit 420 and the programs read from the non-volatile memory 423.

A system timer 425 is a time measurement unit that measures the remaining time until the start of an auto power off function that turns off various kinds of display members to be described below and the exposure time.

This auto power off function is used to turn off various kinds of display members to be described below when it is determined that the photographer has not operated the digital camera 400 for a predetermined time. In this way, consumption of the battery is prevented.

A power supply unit 430 includes a primary battery such as an alkaline battery or a lithium battery, a secondary battery such as a nickel-cadmium (NiCd) battery, a nickel metal hydride (NiMH) battery, or a lithium ion (Li) battery, or an alternating current (AC) adapter.

A power supply control unit 431 includes, for example, a circuit for detecting the power supply unit 430 serving as a power supply for driving the digital camera 400, a DC-DC converter, and a switch circuit for switching a power supply destination.

The power supply unit 430 detects attachment and removal of a battery to and from the digital camera 400, the kind of the battery, and the remaining amount of the battery.

In addition, the power supply control unit 431 controls the DC-DC converter based on the detection result and an instruction from the system control unit 420 and supplies a necessary voltage to a destination at necessary timing.

A communication terminal 440 is included in the digital camera 400 and is electrically connected to a lens communication terminal 506 to be described below.

Since the communication terminal 440 is electrically connected, the system control unit 420, which controls the entire digital camera 400, can communicate with a lens unit 500 to be described below.

A recording medium interface (I/F) 441 is an interface with a recording medium 600 to be described below.

An orientation detection unit 442 detects the orientation of the digital camera 400 with respect to the direction of gravity.

Based on the orientation detected by the orientation detection unit 442, it is possible to output direction information indicating whether an image captured by the imaging unit 411 is an image captured by the digital camera 400 horizontally held or an image captured by the digital camera 400 vertically held.

The system control unit 420 can add the direction information outputted by the orientation detection unit 442 to the image data.

An acceleration sensor, a gyroscope sensor, or the like may be used as the orientation detection unit 442.

By using an acceleration sensor or a gyroscope sensor as the orientation detection unit 442, it is possible to detect the motion of the digital camera 400 (for example, whether the digital camera 400 is performing panning or being tilted, lifted, or stationary).

An eye (an object) 700 of the photographer comes close to (comes into contact with) an eyepiece unit 443 of the digital camera 400.

An eye detection unit 444 is a proximity or contact detection sensor that detects proximity and separation of the eye 700 to and from the eyepiece unit 443.

The eye detection unit 444 detects whether the eye 700 comes close to or comes into contact with the eyepiece unit 443 based on whether a light receiving unit (not illustrated) of an infrared proximity sensor has received light.

Once the eye detection unit 444 detects proximity of the eye 700 to the eyepiece unit 443, the system control unit 420 recognizes that the eye 700 is close to the eyepiece unit 443 until the eye detection unit 444 detects separation of the eye 700 from the eyepiece unit 443.

Once the eye detection unit 444 detects separation of the eye 700 from the eyepiece unit 443, the system control unit 420 recognizes that the eye 700 is not close to the eyepiece unit 443 until the eye detection unit 444 detects proximity of the eye 700 to the eyepiece unit 443.

The above infrared proximity sensor is only an example. For the eye detection unit 444, any sensor capable of detecting proximity of an eye or an object to the eyepiece unit 443 may be used.

The above memory 421 also serves as an image display memory (a video memory).

The digital signal or the image data written in the memory 421 is displayed on a rear-side display unit 450 or an electronic view finder (EVF) 451 via the memory control unit 422.

The rear-side display unit 450 displays an image based on the signal from the memory control unit 422.

When the eye detection unit 444 detects proximity of the eye 700 to the eyepiece unit 443, the EVF 451 displays an image based on the signal from the memory control unit 422.

As described above, analog signals generated by the imaging unit 411 are converted into digital signals by the A/D converter 412. These digital signals are recorded in the memory 421, are next sequentially transferred to the rear-side display unit 450 or the EVF 451, and are finally displayed.

Thus, the digital camera 400 realizes a live view display in which captured images are displayed in real time.

Based on the state detected by the above eye detection unit 444, the system control unit 420 switches display (a display state) or non-display (a non-display state) of the rear-side display unit 450 and the EVF 451.

When the eye 700 is not close to the eyepiece unit 443, captured images are displayed on the rear-side display unit 450. That is, no images are displayed on the EVF 451.

When the eye 700 is close to the eyepiece unit 443, captured images are displayed on the EVF 451. That is, no images are displayed on the rear-side display unit 450.

An operation unit 460 includes various kinds of operation members, as an input unit for receiving operations from the user.

The operation unit 460 includes various kinds of operation members to be described below (a mode switching switch 461, a shutter button 462, a first shutter switch 463, a second shutter switch 464, a touch panel 465, and a power supply switch 466).

The operation unit 460 is an operation unit for entering various kinds of operational instructions to the system control unit 420.

The mode switching switch 461 switches the operation mode of the system control unit 420 to any one of a still image shooting mode, a video shooting mode, etc.

The still image shooting mode includes an auto shooting mode, an auto scene determination mode, and a manual shooting mode.

The still image shooting mode includes an aperture priority mode (Av mode), a shutter speed priority mode (Tv mode), and a program AE mode (P mode).

Likewise, the video shooting mode may include a plurality of shooting modes.

The photographer presses the shutter button 462 to give a capturing preparation instruction and a capturing instruction.

The first shutter switch 463 turns on when the photographer presses the shutter button 462 of the digital camera 400 halfway down, which is so-called half press (a capturing preparation instruction), and generates a first shutter switch signal SW1.

This first shutter switch signal SW1 starts a capturing preparation operation such as auto focus (AF) processing, auto exposure (AE) processing, and auto white balance (AWB) processing.

The second shutter switch 464 turns on when the photographer fully presses the shutter button 462, which is so-called full press (a capturing instruction), and generates a second shutter switch signal SW2.

When the second shutter switch signal SW2 is generated, the system control unit 420 performs processing from reading of an analog signal obtained by the imaging unit 411 to signal conversion performed by the A/D converter 412 and the image processing unit 413.

In addition, the system control unit 420 starts image capturing processing including writing of the image data temporarily stored in memory 421 in the recording medium 600 to be described below.

The touch panel 465 is a device that detects a touch or drag operation by the photographer.

Herein, the touch panel 465 is integrated with the rear-side display unit 450. The photographer can operate the touch panel 465 by touching a display unit of the rear-side display unit 450 with a finger.

The power supply switch 466 is a switch for switching ON/OFF of the power supply. With this switching operation of the power supply switch 466, the power supply control unit 431 controls the power supply from the power supply unit 430.

A fan 470 is disposed inside a duct to be described below in the present exemplary embodiment of the present disclosure.

This fan 470 is controlled by the system control unit 420 and generates an air current to exhaust the heat generated by the heat sources inside the digital camera 400 to the outside.

The lens unit 500 is a replaceable lens that can be attached to and detached from the digital camera 400.

In FIG. 8, for simplicity, the lens 501 is illustrated as a single lens. However, the lens 501 is actually formed by a plurality of lenses for generating an optical image (an object image) from the light reflected by an object.

The lens communication terminal 506 is a communication terminal for the lens unit 500 to communicate with the digital camera 400.

Since the lens communication terminal 506 and the communication terminal 440 are electrically connected to each other as described above, the lens unit 500 can communicate with the system control unit 420, which controls the entire digital camera 400.

In this way, the system control unit 420 can communicate with a lens system control circuit 505 and an aperture drive circuit 504 and control the position of an aperture 503 and the focus state of the real image obtained after the lens 501 is shifted.

The recording medium 600 is a recording medium that can be attached to and detached from the digital camera 400. For example, the recording medium 600 is a memory card for recording captured images.

Examples of the recording medium 600 include a secure digital (SD) card, a FLASH® memory, and a hard disk.

Figure 1B:
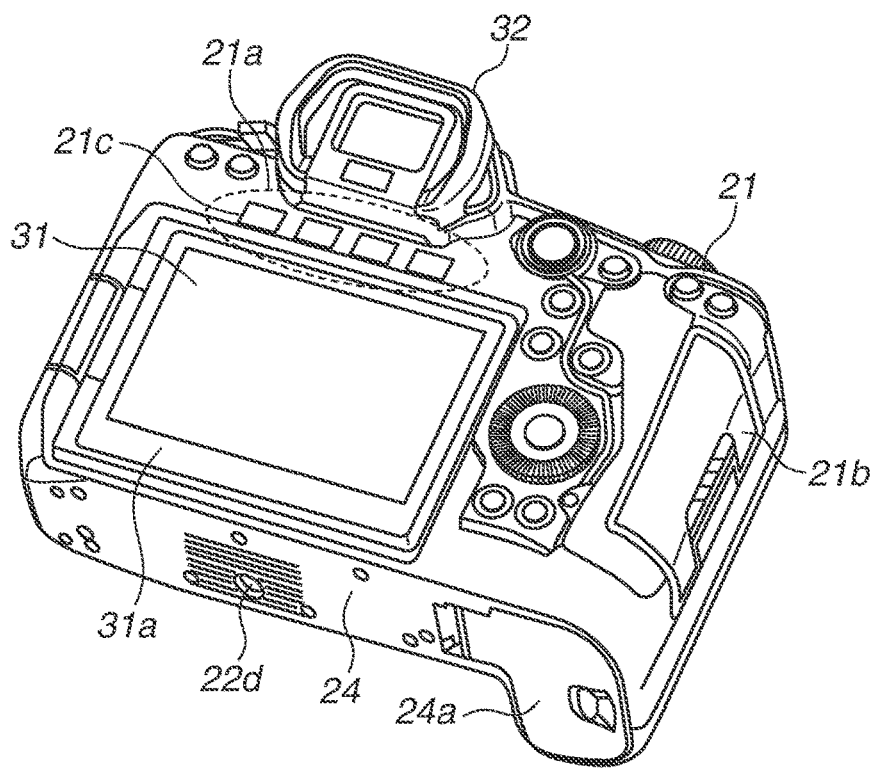

FIG. 1A is a perspective view of the front side of a digital camera 100, and FIG. 1B is a perspective view of the rear side of the digital camera 100.

(Perspective View of Rear Side of Digital Camera 100)

The digital camera 100 has a rear cover 21 to which various kinds of operation members for operating the digital camera 100 are attached. Since these operation members and display members are not related to the present exemplary embodiment of the present disclosure, description of these members will be avoided.

A display unit storage unit 21a stores a rear-side display unit 31 to be described below.

A recording medium cover 21b protects the opening of a recording medium IF for storing a memory card for recording captured images.

A vent 21c is for suctioning or exhausting the air from the duct to be described below and is formed in the rear cover 21.

The digital camera 100 has a front base 22 having a grip part 22a. This grip part 22a is shaped such that the user can easily hold the grip part 22a with his or her right hand when holding the digital camera 100. The front base 22 and the grip part 22a are formed integrally.

The digital camera 100 has a tripod socket 22d.

The digital camera 100 has a top cover 23 to which various kinds of operation members for operating the digital camera 100 are attached.

Since these operation members and display members are not related to the present exemplary embodiment of the present disclosure, description of these members will be avoided. In addition, a shoulder-part display unit 33 including, for example, a liquid crystal panel for checking various kinds of setting states is attached to the top cover 23.

The digital camera 100 has a bottom cover 24, and a battery cover 24a for attaching and detaching a battery is attached to the bottom cover 24.

The digital camera 100 has a side cover 25, and a vent 25b for suctioning or exhausting the air from the duct to be described below is formed in the side cover 25.

Terminal covers 25a protect external communication terminals 12c to be described below.

An interchangeable lens (not illustrated) is attached to and detached from a mount 26.

An imaging optical axis O goes through the center of the mount 26.

A lens communication terminal 26a electrically communicates with the interchangeable lens.

The rear-side display unit 31 includes, for example, a liquid crystal panel. With a rear-side liquid crystal display (LCD) part 31a capable of detecting a touch operation on the display surface, a preview image based on the imaging element and various kinds of setting states can be displayed and set.

In addition, the rear-side display unit 31 is a so-called variable angle monitor rotatably attached to the digital camera 100. The rear-side display unit 31 is stored in the display unit storage unit 21a attached to the rear cover 21.

An eye of the user comes into contact with a finder 32. A finder display unit 32a displays an image outputted by an imaging element unit 11 to be described below and is a so-called EVF.

(Exploded Perspective View of Main Part of Internal Structure of Digital Camera 100)

Figure 2:
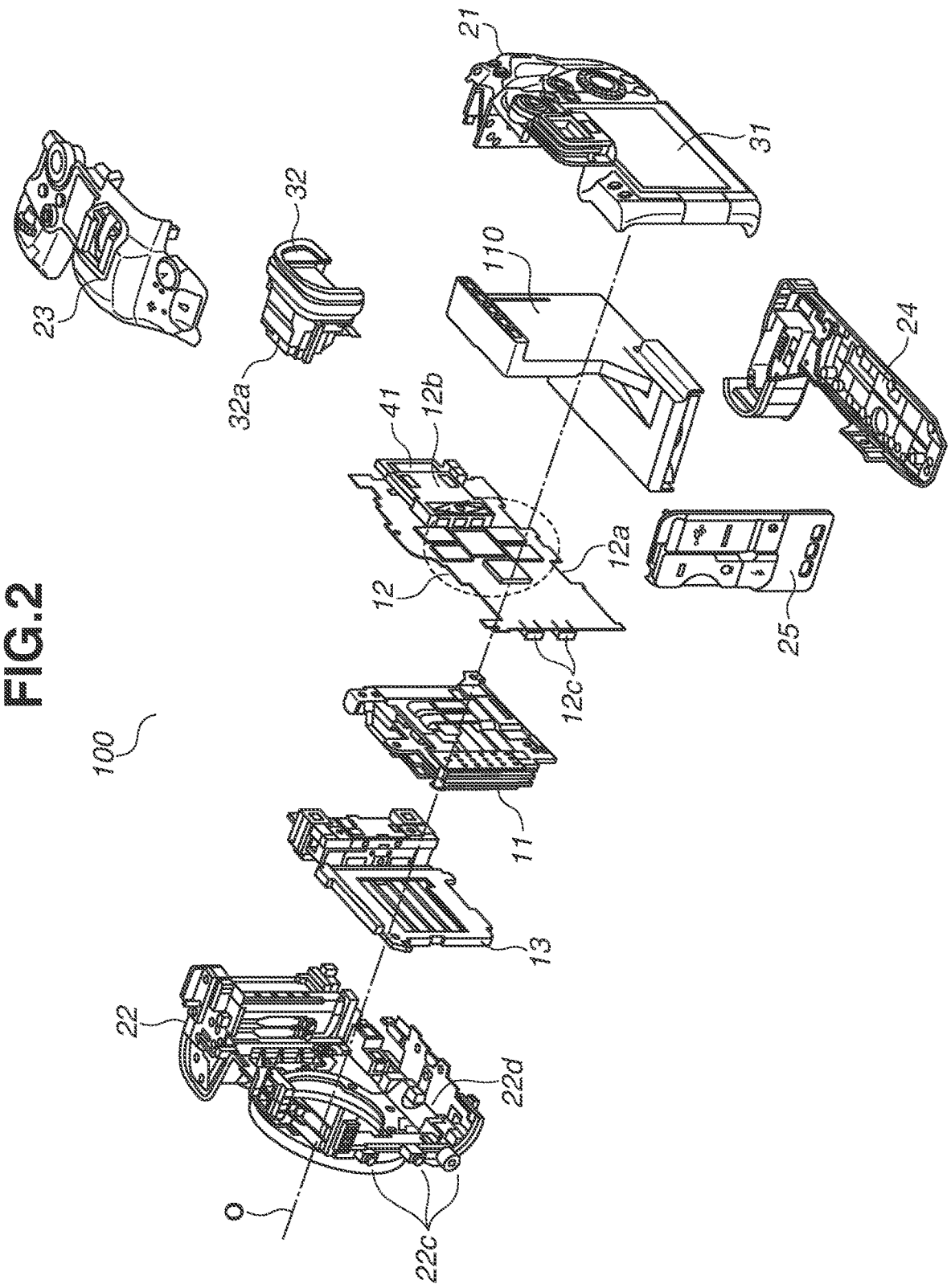
FIG. 2 is an exploded perspective view of the digital camera according to the first exemplary embodiment of the present disclosure.

FIG. 2 is an exploded perspective view of a main part for illustrating an internal structure of the digital camera 100.

As illustrated in FIG. 2, the exterior of the digital camera 100 is formed by the above rear cover 21, front base 22, top cover 23, bottom cover 24, and side cover 25.

The imaging element unit 11, a main board 12, a duct 110, a shutter 13, and the finder 32 are disposed inside the digital camera 100.

The imaging element unit 11 is an imaging device having an imaging surface on which an object image (an optical image) that has passed through the above interchangeable lens (not illustrated) is formed.

The imaging element unit 11 includes a movable unit (not illustrated) including a CMOS sensor (not illustrated) and a fixed unit 11c. The CMOS sensor outputs an electrical signal (an analog signal) based on the optical image formed on the imaging surface through photoelectric conversion.

The movable unit is a unit movable with the CMOS sensor and includes a magnet or a coil (not illustrated) that generates drive force.

The fixed unit 11c is for fixing the imaging element unit 11 to the front base 22 and includes a magnet or a coil (not illustrated) that generates drive force.

A control integrated circuit (IC) group 12a, which controls an imaging signal, a recording medium IF 12b for storing an external recording medium, and the external communication terminals 12c for connecting connection cables to external devices (not illustrated) are mounted on the main board 12. The external communication terminals 12c are covered by the terminal covers 25a.

Other than these components, electronic components such as various ICs, chip resistors, chip capacitors, inductors, transistors, and interface connectors are mounted (not illustrated). However, description of these components will be avoided.

The duct 110 brings the air outside the digital camera 100 into an area around heat sources such as the imaging element unit 11 and the control IC group 12a.

In addition, the duct 110 includes a centrifugal fan 131, which generates an air current inside the duct 110.

Among the components of the digital camera 100, particularly the imaging element unit 11 and the control IC group 12a consume much power and generate much heat. Thus, the imaging element unit 11 and the control IC group 12a are subject to a significant temperature rise.

In addition, while heated by themselves, the imaging element unit 11 and the control IC group 12a are also heated by the radiation heat from their surrounding members. As a result, the imaging time of the digital camera 100 is limited by the guaranteed operating temperatures of the individual members.

To keep the imaging time as long as possible, the imaging element unit 11 and the control IC group 12a, which are heat sources, need to be cooled so that the guaranteed operating temperature will not be exceeded.

Thus, in the present exemplary embodiment, the duct 110 is disposed on the rear side of the main board 12 as illustrated in FIG. 2, and a heat release mechanism 120 to be described below is used to cool the imaging element unit 11 and the control IC group 12a by bringing the imaging element unit 11 and the control IC group 12a into thermal contact with the duct 110.

(Internal Structure of Duct 110)

Figure 3A:
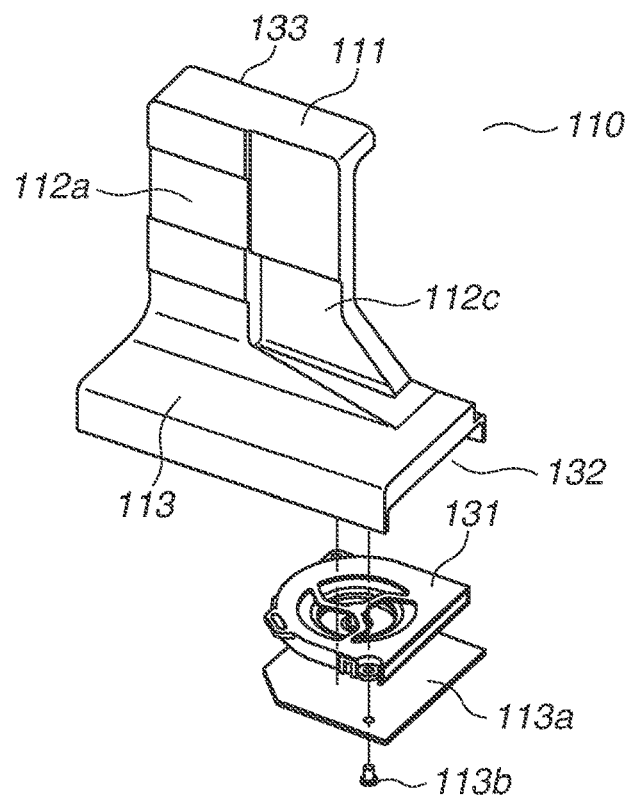
FIGS. 3A and 3B are perspective views of a duct according to the first exemplary embodiment of the present disclosure.
Figure 3B:
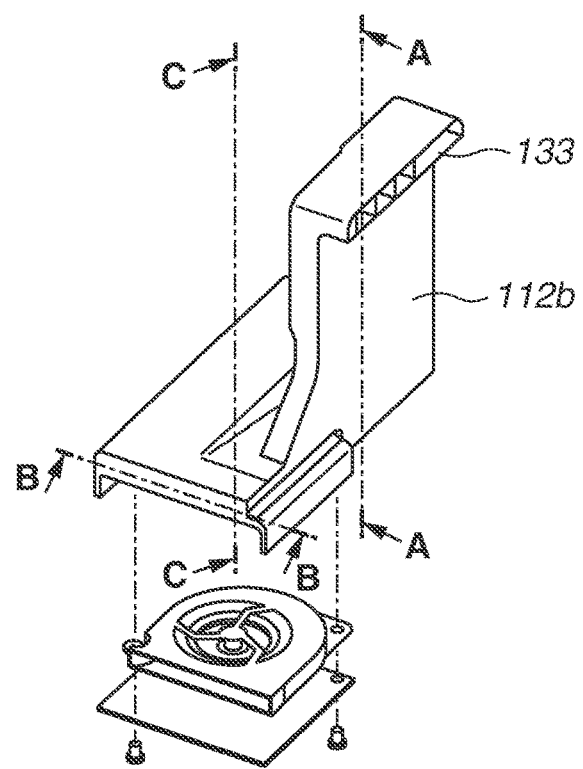
Figure 4:
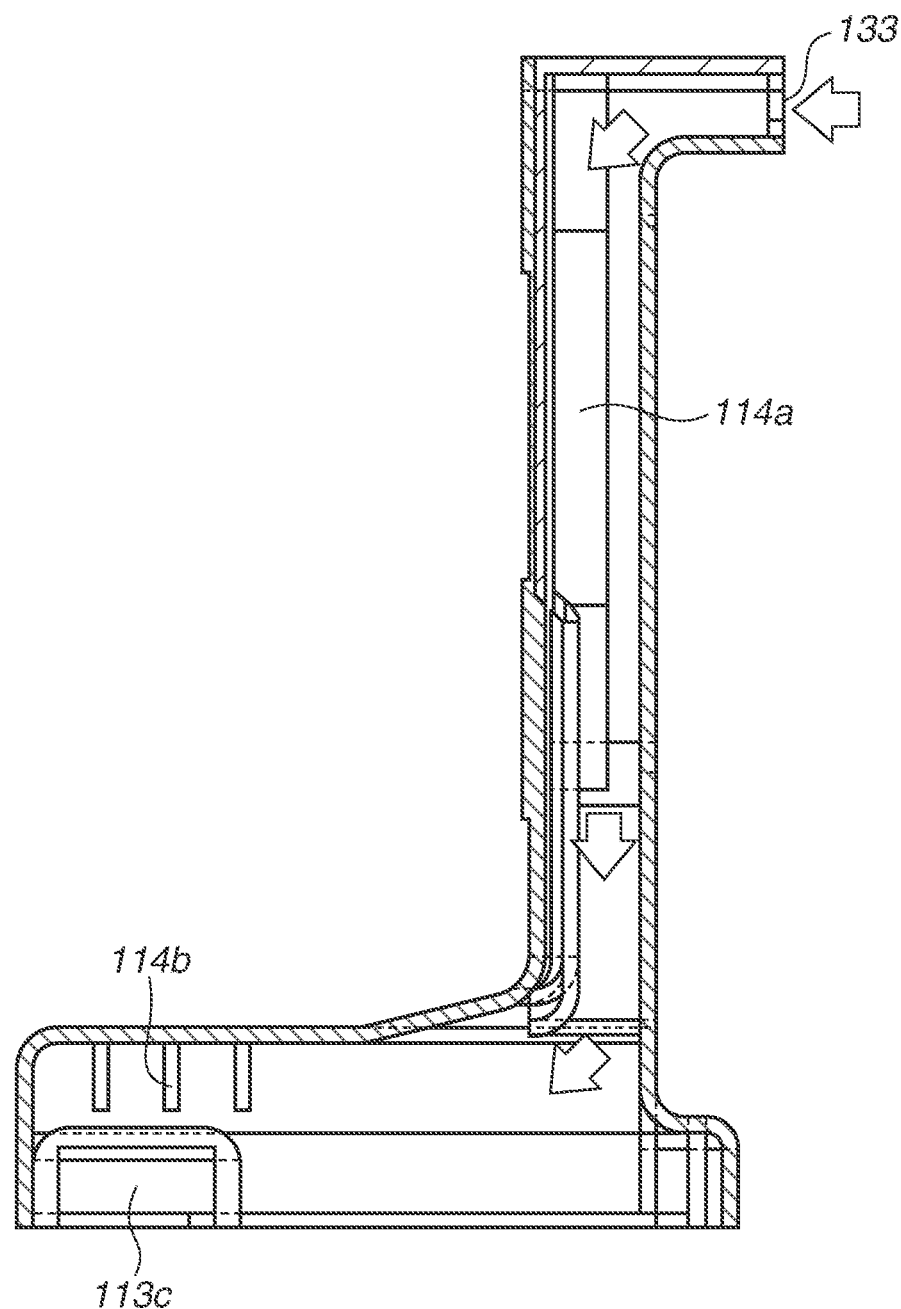
FIG. 4 is a sectional view of an internal structure of the duct according to the first exemplary embodiment of the present disclosure.

FIG. 3A is a perspective view of the front side of the duct 110, and FIG. 3B is a perspective view of the rear side of the duct 110. FIG. 4 is a sectional view of the internal structure of the duct 110, taken along line A-A in FIG. 3B.

The shape of the duct 110 will be described in detail with reference to FIGS. 3A and 3B and FIG. 4.

The duct 110 includes a first duct part 111, a second duct part 112, and a third duct part 113.

The first duct part 111 is approximately parallel to the imaging optical axis O and is located below the finder 32 near the display structure storage unit 21a.

By disposing the first duct part 111 near the finder 32, the area of contact between the second duct part 112 to be described below and the control IC group 12a can be widened. Thus, this location of the first duct part 111 is advantageous in heat release.

The second duct part 112 is connected to the first duct part 111 and is approximately perpendicular to the imaging optical axis O. The second duct part 112 is located behind the imaging element unit 11 and the control IC group 12a mounted on the main board 12.

The second duct part 112 includes a second front duct part 112a forming a surface facing the control IC group 12a mounted on the main board 12 and a second rear duct part 112b forming a surface opposite to the second front duct part 112a.

The second duct part 112 also includes a second duct concave part 112c having a concave shape. This second duct concave part 112c is located on a surface facing the main board 12 such that the second duct concave part 112c does not overlap with the projection plane of the control IC group 12a.

Since this concave shape locally decreases the cross section of the second duct 112, more air current flows around third heat transfer members 123 to be described below in the second duct 112.

As a result, the heat of the control IC group 12a can be efficiently released.

By disposing the second duct concave part 112c at a location that does not overlap with the projection plane of the heat source, the heat inside the digital camera 100 can be efficiently diffused.

Thus, it is preferable that a part, such as the second duct concave part 112c, of the duct 110 be disposed at a location that does not overlap with the projection plane.

By using the space created by the concave shape, a connector part for connecting the imaging unit 11 and the main board 12 and a flexible printed circuit (FPC) are disposed on a side of the main board 12, the side facing the second duct concave part 112c.

The third duct part 113 is connected to the second duct part 112.

The third duct part 113 is approximately parallel to the imaging optical axis O and is located below the two heat sources of the imaging element unit 11 and the control IC group 12a mounted on the main board 12.

The third duct part 113 is provided with a bottom-side duct cover 113a, which is fixed to the third duct part 113 via an elastic member (not illustrated).

A tripod socket placement part 113c is formed by cutting off a part of the third duct part 113. The tripod socket 22d placed in the tripod socket placement part 113c is firmly fixed to a rigid member.

In the present exemplary embodiment, the tripod socket 22d is firmly fixed to the front base 22, which is made of a magnesium alloy.

In this way, even if the digital camera 100, to which the tripod socket 22d has been attached, receives strong force from the outside, since the tripod socket 22d is firmly fixed to the rigid member, deformation of the entire digital camera 100 can be prevented.

In other words, by preventing deformation of the imaging unit 11 and the components therearound, the impact of the strong force on the captured images can be minimized.

In addition, preventing the deformation of the entire digital camera 100 also unit prevents the deformation of the duct 110. That is, an advantageous effect of preventing reduction in heat transfer efficiency can be achieved.

The first duct part 111 has an air inlet opening 133.

An elastic member (not illustrated) is disposed between the air inlet opening 133 and the vent 21c formed in the rear cover 21. Thus, there is no space between the air inlet opening 133 and the vent 21c.

The third duct part 113 has an air outlet opening 132.

An elastic member (not illustrated) is disposed between the air outlet opening 132 and the vent 25b formed in the side cover 25. Thus, there is no space between the air outlet opening 132 and the vent 25b.

By using the above elastic members, the space between the vent 21c and the vent 25b is formed as a single enclosed space.

As a result, an air passage is formed, and it is possible to prevent drops of water, sand, etc. from entering into the digital camera 100 from the outside.

To reduce the pressure loss in the passage in the duct 110, it is preferable that the passage in the first duct part 111, the passage in the second duct part 112, and the passage in the third duct part 113 have the same cross-sectional area as much as possible.

In a case where the first to third duct parts 111 to 113 have different cross-sectional areas, these duct parts 111 to 113 are formed such that the difference among the cross-sectional areas is minimized.

Each of the first duct part 111, the second duct part 112, and the third duct part 113 may be formed as separate components, which are to be firmly fixed to each other to form the corresponding duct part or may be formed as a single component by using, for example, a three-dimensional (3D) printer.

In addition, the duct parts 111 to 113 may be connected to each other by firmly fixing the duct parts 111 to 113 to each other. Alternatively, the duct parts 111 to 113 may be formed as a single duct part by using, for example, a 3D printer.

In the former case, it is desirable to maintain the sealability of the duct 110 by inserting an elastic member (not illustrated) between duct parts.

As long as the enclosed space is formed, the method for firming fixing the duct parts 111 to 113 to each other is not limited to a particular method. For example, screws, adhesive, or swaging tools may be used to form the enclosed space.

It is preferable that the first duct part 111, the second duct part 112, and the third duct part 113 be made of material having a high thermal conductivity, to achieve efficient heat transfer from the heat sources.

However, since the second rear duct part 112b contributes to the diffusion of the heat from the heat sources relatively less, the second rear duct part 112b may be made of material having a thermal conductivity lower than that of the second front duct part 112a.

In addition, to reduce the weight of the digital camera 100, it is preferable that the duct parts 111 to 113 be made of material having a low specific gravity. By using a metal material as the principal material of the duct 110, the duct 110 can be used as a ground chassis of the digital camera 100. Thus, use of a metal material as the principal material is advantageous in noise resistance.

In the present exemplary embodiment, the first duct part 111, the second front duct part 112a, and the third duct part 113 are made of aluminum, and the second rear duct part 112b is made of polycarbonate.

By forming the second rear duct part 112b integrally with the rear cover 21, it is possible to reduce the thickness of the apparatus in the direction of the rear side.

A surface of the second front duct part 112a, the surface being opposite to the main board 12, is provided with a first fin part 114a including a plurality of convex shapes.

In this way, the surface area of the second duct part 112 is increased, and the area of heat exchange between the air inside the duct 110 and the air outside the duct 110 is increased, whereby the cooling efficiency is improved.

A surface of the third duct part 113, the surface being opposite to the imaging element unit 11, is provided with a second fin part 114b including a plurality of convex shapes in the forward direction along the imaging optical axis O.

In this way, the surface area of the third duct part 113 is increased, and the area of heat exchange between the air inside the duct 110 and the air outside the duct 110 is increased, whereby the cooling efficiency is improved.

The centrifugal fan 131 is an air blowing unit for creating an air current inside the duct 110 and is fixed to the third duct part 113 by fixing parts 113b, along with the bottom-side duct cover 113a.

When the centrifugal fan 131 is driven, the air outside the digital camera 100 flows into the duct 110 from the air inlet opening 133 through the vent 21c.

After the air flowing through the air inlet opening 133 passes through the first fin part 114a in the second duct part 112, the air passes through the second fin part 114b in the third duct part 113.

When the air flowing through the air inlet opening 133 passes through the first fin part 114a and the second fin part 114b, which have been heated by the heat sources, the fins are cooled and the heat sources are consequently cooled.

After passing through the fins, the air is suctioned into the centrifugal fan 131 and is exhausted to the outside of the digital camera 100 through the air outlet opening 132 and the vent 25b.

In the present exemplary embodiment, the air is suctioned from the vent 21c and is exhausted from the vent 25b, as described above.

This is to dispose the air outlet opening 132 at a location away from the face of the user, for example.

As long as a desired cooling effect can be achieved, the duct 110 and the centrifugal fan 131 may be arranged differently. For example, the air may be suctioned from the vent 25b and may be exhausted from the vent 21c. This structure will be described below as a variation.

In addition, in the present exemplary embodiment, a centrifugal fan is used as the air blowing unit. The present exemplary embodiment is not limited to this example. For example, a component such as an axial fan may alternatively be used, as long as the above purpose can be achieved.

(Heat Connection Between Duct 110 and Heat Sources)

FIGS. 5A and 5B illustrate heat connection between the duct 110 and the heat sources. FIG. 5A is a sectional view taken along line B-B in FIG. 3B. Specifically, FIG. 5A is an exploded perspective view of the duct 110 and the imaging element unit 11.

FIG. 5B is a sectional view taken along line C-C in FIG. 3B. Specifically, FIG. 5B is an exploded perspective view of the duct 110 and the control IC group 12a mounted on the main board 12.

As described above, the imaging element unit 11 includes the movable unit including the CMOS sensor and the fixed unit 11c.

The fixed unit 11c partially extends in the direction of the third duct part 113, as illustrated in FIG. 5A. The heat accumulated in the fixed unit 11c is transferred to the duct 110 via this extended part and a heat transfer member to be described below.

The heat release mechanism 120 includes heat transfer members thermally connecting the plurality of heat sources and the duct 110.

A first heat transfer member 121 is a member for improving thermal diffusion of the movable unit. The first heat transfer member 121 has one end connected to the movable unit and another end connected to the extended part of the fixed unit 11c.

A highly conductive, flexible, and deformable sheet member, e.g., a graphite sheet, is used as the first heat transfer member 121. The part of the first heat transfer member 121 connected to the movable unit can move with the movable unit.

With this first heat transfer member 121, the heat accumulated in the movable unit is transferred to the duct 110 via a second heat transfer member 122 to be described below.

The second heat transfer member 122 is a heat transfer rubber for thermally connecting the third duct part 113, the fixed unit 11c, and the first heat transfer member 121.

With this second heat transfer member 122, the heat generated by the imaging element unit 11 is transferred to the duct 110.

The second heat transfer member 122 is in contact with the third duct part 113, and the above-described second fin part 114b is located on the opposite side of the contact surface.

Thus, since a large surface area is ensured by the second fin part 114b, the heat generated by the imaging element unit 11 is efficiently subject to heat exchange, and as a result, a high cooling performance is achieved.

The third heat transfer member 123 is a heat transfer rubber for thermally connecting the control IC group 12a mounted on the main board 12 and the second duct part 112.

With these sheet transfer members 123, the heat generated by the control IC group 12a mounted on the main board 12 is transferred to the duct 110.

The third heat transfer members 123 are into contact with the second duct part 112, and the above-described first fin part 114a is located on the opposite side of the contact surface.

Thus, the heat generated by the control IC group 12a is efficiently exchanged with the air inside the duct 110 by the first fin part 114a, and as a result, a high cooling performance is achieved.

It is preferable that the thickness of the second heat transfer member 122 be approximately the same as or more than that of the third heat transfer member 123.

This is because variation in individual difference and assembly is larger in the direction in which the second heat transfer member 122 and the third duct part 113 are pressed with each other. This variation can be absorbed by the elasticity of this heat transfer member.

In the present exemplary embodiment, a graphite sheet and a heat transfer rubber are used as the heat transfer members. However, the present exemplary embodiment is not limited to such example. Any other heat transfer members that have a thermal conductivity higher than that of members such as resin and that satisfy other mechanical and electrical performances may be used. Examples of the heat transfer members include metal foil and heat pipes.

Figure 7:
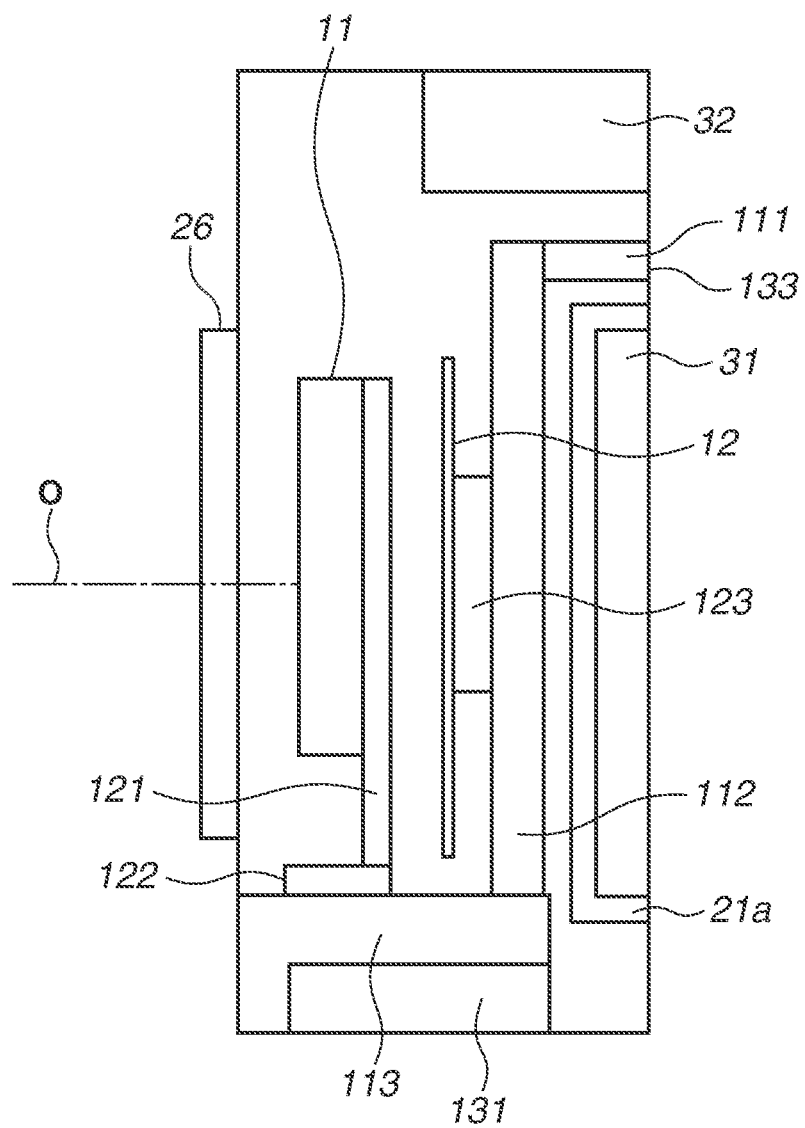
FIG. 7 schematically illustrates the internal structure of the duct according to the first exemplary embodiment of the present disclosure.

FIG. 7 is a schematic cross section of the digital camera 100.

(Comparison of Data of Heat Release Effect)

TABLE 1

|  | Digital camera for comparison (without fan) | Digital camera according to first exemplary embodiment (with fan) |
| --- | --- | --- |
| Imaging element unit 11 | 111.5° C. | 58.6° C. |
| Main board 12 | 95.6° C. | 89.9° C. |

Table 1 illustrates comparison between the digital camera according to the first exemplary embodiment and a digital camera according to a comparative example without the centrifugal fan 131 and the duct 110.

More specifically, Table 1 illustrates comparison between the highest temperatures at which the heat sources of the present digital camera reached and the highest temperatures at which the heat sources of the comparative digital camera reached when image recording was performed with 8K30P under a temperature of 23 degrees.

8K30P signifies video capturing of 30 frames per second with 8K.

In the case of the first exemplary embodiment, the centrifugal fan 131 was operated with a wind speed of 12 liters per minute (L/min). This "L/min" is a unit for the volume flow rate.

As indicated by Table 1, in the case of the digital camera including the centrifugal fan 131 and the duct 110, the highest temperature at which the imaging element unit 11 reached was 58.6 degrees, and the highest temperature at which the main board 12 reached was 89.9 degrees. In contrast, in the case of the digital camera according to the comparative example, the highest temperature at which the imaging element unit 11 reached was 111.5 degrees, and the highest temperature at which the main board 12 reached was 95.6 degrees.

From Table 1, it is seen that the centrifugal fan 131 and the duct 110 prevent increase of the temperatures of the heat sources.

In addition, assuming that the restrictive temperature at which the digital camera 100 stops its function is 95 degrees or less, the structure according to the first exemplary embodiment enables unlimited image capturing with 8K30P in the environment of 23° C.

Hereinafter, the present exemplary embodiment will be briefly described with reference to FIG. 7.

The imaging apparatus 100 according to the present exemplary embodiment includes the exterior members 21 to 25, the control circuit 12a controlling the imaging apparatus, the display panel 31 disposed on the rear side as an exterior member, and the heat release fan 131 disposed on the bottom side 24 (bottom cover) as an exterior member).

In addition, the control circuit board 12 on which the control circuit 12a controlling the imaging apparatus is mounted, and the display panel 31 are arranged sequentially in the direction of the optical axis from the front side to the rear side.

The duct 110 having the vent 132 on the upper side of the rear side 21 as an exterior member extends in the direction of the optical axis from the rear side to the front side.

In addition, the duct 110 extends in the direction from the upper side to the bottom side in the area between the control circuit board 12 and the display panel 31 and connects to the vent 133 formed on the bottom side as an exterior member.

The heat release fan 131 is disposed inside the duct 110 near the bottom side 24 below the control circuit board 12.

The imaging apparatus 100 includes the imaging element board 11 on which the imaging element is mounted.

The duct 110 extends in the direction of the optical axis from the rear side to the front size, extends in the area formed by the heat release fan 131 disposed on the bottom side of the duct, the imaging element board 11, and the control circuit board 12, and connects to the vent 133 formed near the bottom side 24 as an exterior member.

The imaging apparatus 100 includes the connection terminal units 12c for electrically connecting to external devices, and the intake vent 132 is disposed at a location that does not overlap with these connection terminal units 12c.

The imaging apparatus 100 includes a fixing unit 22d for fixing the imaging apparatus 100 to a tripod, and the exhaust vent 133 is disposed at a location that does not overlap with these connection terminal units 12c.

With the movable mechanism (movable unit) and the fixed unit 11c, the imaging element board 11 moves in a direction different from the direction of the optical axis for collecting image blurring. The movable mechanism (movable unit) and the fixed unit 11c form a voice coil motor (VCM) including a coil and a magnet.

The imaging element board 11 is driven based on the vibration detection result of an angular rate detection sensor (a gyroscope) not illustrated.

The imaging element board 11 is moved in the yaw direction, the pitch direction, and the roll direction from the optical axis of the imaging optical system so that blurring of an image on the imaging surface of the imaging element caused by camera shake by the user is corrected.

The imaging apparatus 100 includes the EVF 32 on the upper side 23 (top cover) as an exterior member.

When seen from the rear side of the imaging apparatus 100, the vent 132 of the duct formed on the upper side of the rear side 21 (rear cover) as an exterior member is located between the EVF 32 and the display panel.

The rotation axis of the heat release fan 131 is perpendicular to the optical axis.

The vent 133 formed on the bottom side 24 as an exterior member is formed in the front side 22 or a lateral side of the side cover 25 as exterior members.

The imaging apparatus 100 includes the first heat transfer member 121 formed on the imaging element board 11 for transferring the heat generated by the imaging element board 11 to the duct 110.

The imaging apparatus 100 includes the second heat transfer member 122 between the first heat transfer member 121 and the duct 110 for transferring the heat of the first heat transfer member 121 to the duct 110.

The imaging apparatus 100 includes the third heat transfer members 123 that are formed on the control circuit board 12 for transferring the heat generated by the control circuit board 12 to the duct 110.

The thickness of the second heat transfer member 122 is more than or equal to the thickness of the third heat transfer member 123.

The first heat transfer member 121 formed on the imaging element board 11 has a higher thermal conductivity than that of the third heat transfer member 123 formed on the control circuit board 12.

[Variation]

In the first exemplary embodiment, the duct 110 of the digital camera 100 is structured to suction the air from the display structure storage unit 21a and exhaust the air from the vent 25b.

However, the present disclosure is not limited to the above example. Hereinafter, a variation of the first exemplary embodiment will be described.

Figure 6A:
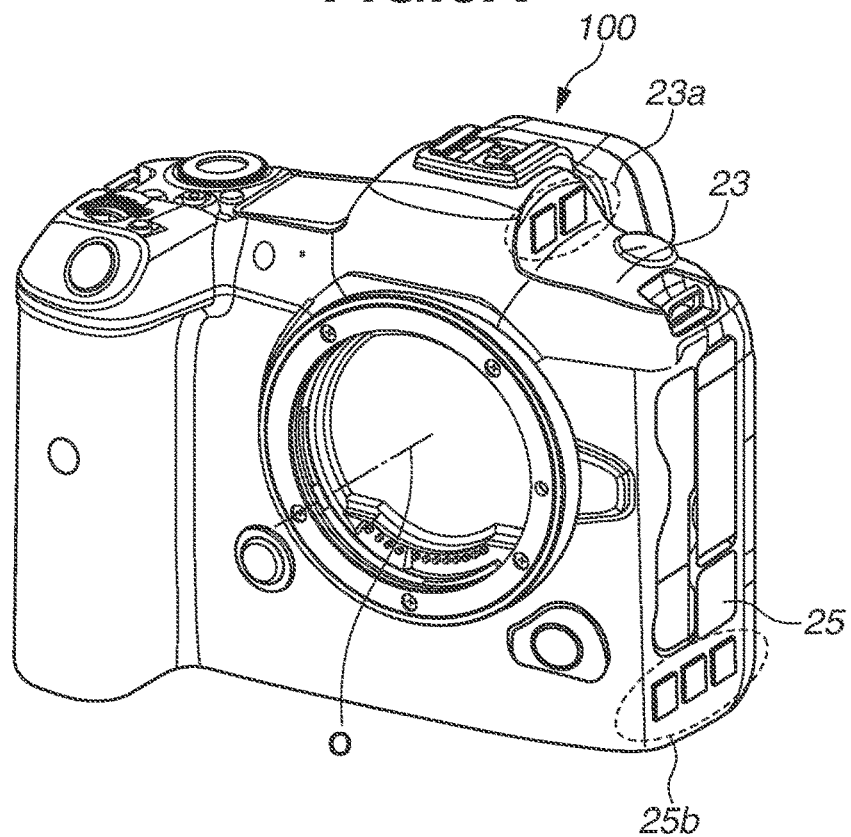
FIGS. 6A and 6B illustrates a variation of the first exemplary embodiment of the present disclosure.
Figure 6B:
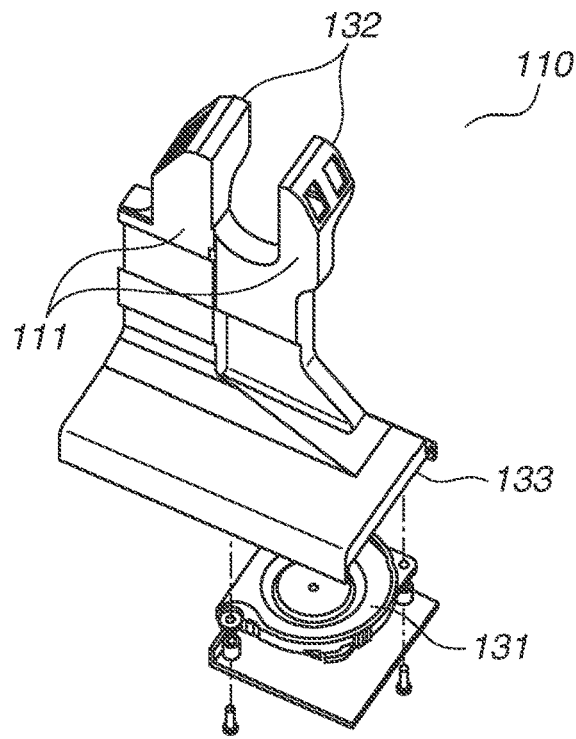

FIGS. 6A and 6B illustrate a configuration in which the suction and exhaust directions in the duct 110 are reversed. FIG. 6A is a perspective view of the front side of a digital camera 101, and FIG. 6B is an exploded perspective view of a duct 110.

A vent 23a is formed in a part of a top cover 23 and is disposed near a finder 32.

A first duct part 111 includes both sides of the finder 32 and connects to a second duct part 112 under the first duct part 111.

While a centrifugal fan 131 is disposed at approximately the same location as that according to the first exemplary embodiment as illustrated in FIG. 6B, the suction and exhaust directions of the centrifugal fan 131 are different.

In this way, the direction of the air flow in the duct 110 is opposite to that according to the first exemplary embodiment.

An air inlet opening 133 is formed in a third duct part 113, and the air outside the digital camera 101 flows into a vent 25b formed in a side cover 25.

An air outlet opening 132 is formed in the first duct part 111, and the air from the vent 23a formed in the top cover 23 is exhausted to the outside of the digital camera 101.

As in this variation, by suctioning the air from a side and exhausting the air from the top side, even when, for example, the face of the user is behind the digital camera 101, the cooling performance can be ensured without giving discomfort to the user.

In this variation, the thermal connection with the heat sources, the other shapes of the duct, etc. are the same as those according to the first exemplary embodiment, and redundant description thereof will be avoided.

The present technique is applicable to electronic apparatuses and image capturing systems.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-040120, filed Mar. 12, 2021, which is hereby incorporated by reference herein in its entirety.

What is claimed is:

1. An imaging apparatus having an imaging element, a top side, a bottom side, a front side, and a rear side having an upper side, the imaging apparatus comprising:
   exterior members;
   a control circuit mounted on a control circuit board and configured to control the imaging apparatus;
   a display panel disposed on the rear side as one of the exterior members; and
   a heat release fan disposed on the bottom side as one of the exterior members,
   wherein the control circuit board and the display panel are arranged sequentially in a direction of an optical axis from the front side to the rear side,
   wherein a duct, that includes a duct rear side and a vent formed on an upper side of the duct rear side as one of the exterior members, extends in the optical axis direction from the rear side to the front side, extends in a direction from the top side to the bottom side in an area between the control circuit board and the display panel, and connects to a bottom side vent formed on the bottom side of the imaging apparatus as one of the exterior members, and
   wherein the heat release fan is disposed inside the duct near the bottom side below the control circuit board.

2. The imaging apparatus according to claim 1, further comprising an imaging element board on which the imaging element is mounted, wherein the duct includes a bottom side and the heat release fan is formed on the bottom side of the duct,
   wherein the duct extends in the optical axis direction from the rear side of the imaging apparatus to the front side, and
   wherein the duct extends in an area formed by the heat release fan, the imaging element board, and the control circuit board, and connects to a vent formed on the bottom side of the imaging apparatus as one of the exterior members.

3. The imaging apparatus according to claim 2, wherein the imaging element board is configured to move in a direction different from the optical axis direction for correcting image blurring.

4. The imaging apparatus according to claim 1, further comprising a connection terminal unit configured to electrically connect to an external apparatus,
   wherein the vent of the duct further is disposed at a location that does not overlap with the connection terminal unit.

5. The imaging apparatus according to claim 1, further comprising a fixing unit configured to fix the imaging apparatus to a tripod,
   wherein the vent of the duct further is disposed at a location that does not overlap with a connection terminal unit.

6. The imaging apparatus according to claim 1, further comprising an electronic view finder disposed on the top side as one of the exterior members,
   wherein, when seen from the rear side of the imaging apparatus, the vent of the duct further is disposed at a location in an area between the electronic view finder and the display panel.

7. The imaging apparatus according to claim 1, wherein a rotation axis of the heat release fan is perpendicular to the optical axis, and the bottom side vent formed on the bottom side as one of the exterior members is formed in the front side or a lateral side of the imaging apparatus as one of the exterior members.

8. The imaging apparatus according to claim 1, further comprising:
   a first heat transfer member formed on the imaging element board for transferring heat generated by the imaging element board to the duct;
   a second heat transfer member formed between the first heat transfer member and the duct for transferring heat of the first heat transfer member to the duct; and
   a third heat transfer member formed on the control circuit board for transferring heat generated by the control circuit board to the duct,
   wherein a thickness of the second heat transfer member is more than or equal to a thickness of the third heat transfer member.

9. The imaging apparatus according to claim 8, wherein the first heat transfer member formed on the imaging element board has a thermal conductivity higher than a thermal conductivity of the third heat transfer member formed on the control circuit board.

10. An imaging apparatus having an imaging element, a top side, a bottom side, a front side, and a rear side having an upper side, the imaging apparatus comprising:
  exterior members;
  a control circuit mounted on a control circuit board and configured to control the imaging apparatus; and
  a display panel disposed on the rear side as one of the exterior members,
  wherein the control circuit board and the display panel are arranged sequentially in a direction of an optical axis from the front side to the rear side,
  wherein a duct, that includes a duct rear side and a vent formed on an upper side of the duct rear side as one of the exterior members, extends in the optical axis direction from the rear side to the front side, extends in a direction from the top side to the bottom side in an area between the control circuit board and the display panel, and connects to a bottom side vent formed on the bottom side of the imaging apparatus as one of the exterior members, and
  wherein a heat release fan is disposed inside the duct.

11. The imaging apparatus according to claim 10, further comprising an imaging element board on which the imaging element is mounted, wherein the duct includes a bottom side,
  wherein the duct extends in the optical axis direction from the rear side of the imaging apparatus to the front side, and
  wherein the duct extends in an area formed by the imaging element board and the control circuit board, and connects to a vent formed on the bottom side of the imaging apparatus as one of the exterior members.

* * * * *